Nov. 4, 1930.　　C. S. JENNINGS ET AL　　1,780,486

CONVEYER SYSTEM

Filed March 30, 1929　　3 Sheets-Sheet 1

Inventors
Chester S. Jennings
Lamont C. Allen
by Roberts, Cushman & Woodbury
Att'ys.

Nov. 4, 1930.  C. S. JENNINGS ET AL  1,780,486
CONVEYER SYSTEM
Filed March 30, 1929   3 Sheets-Sheet 2
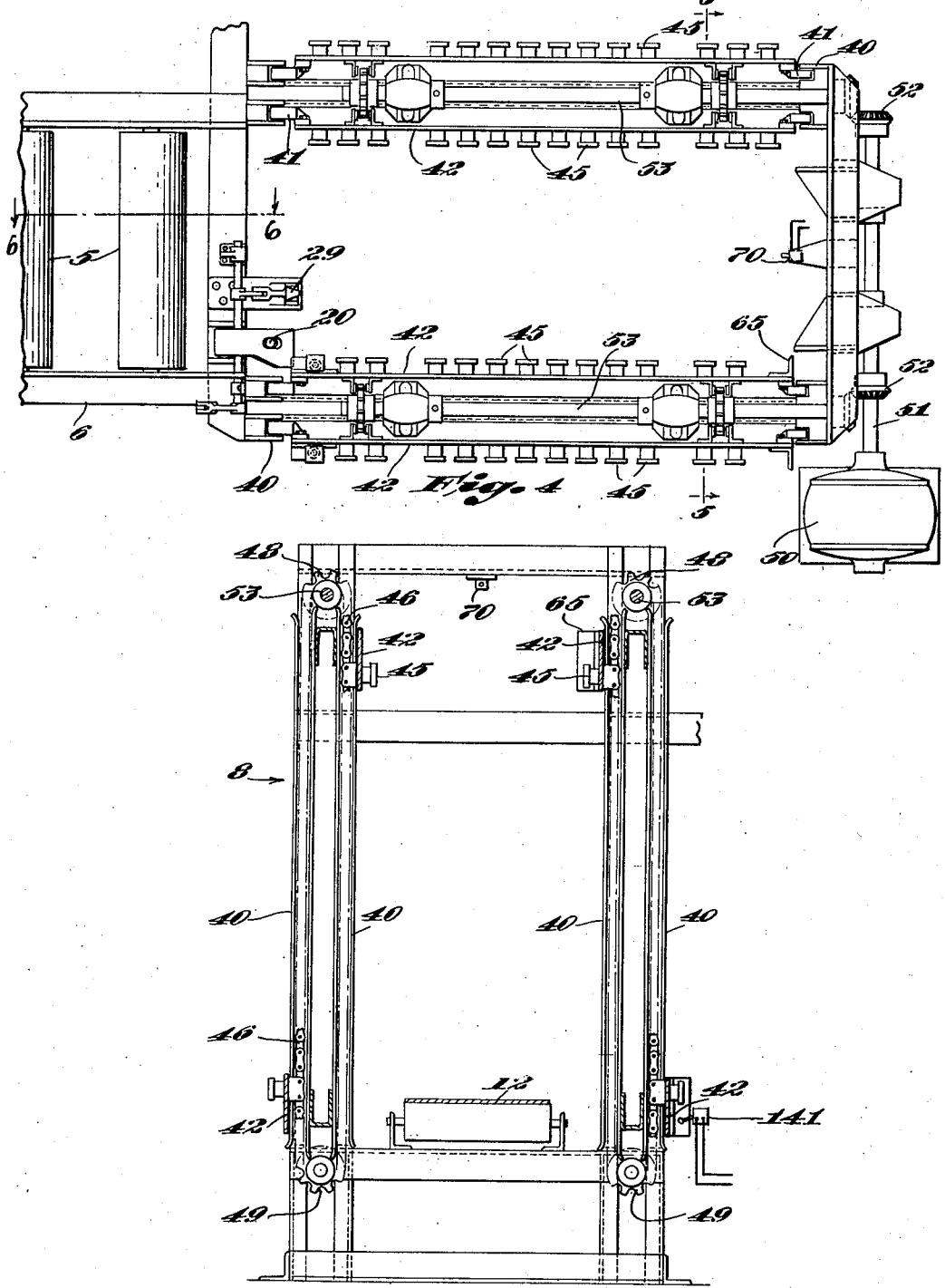

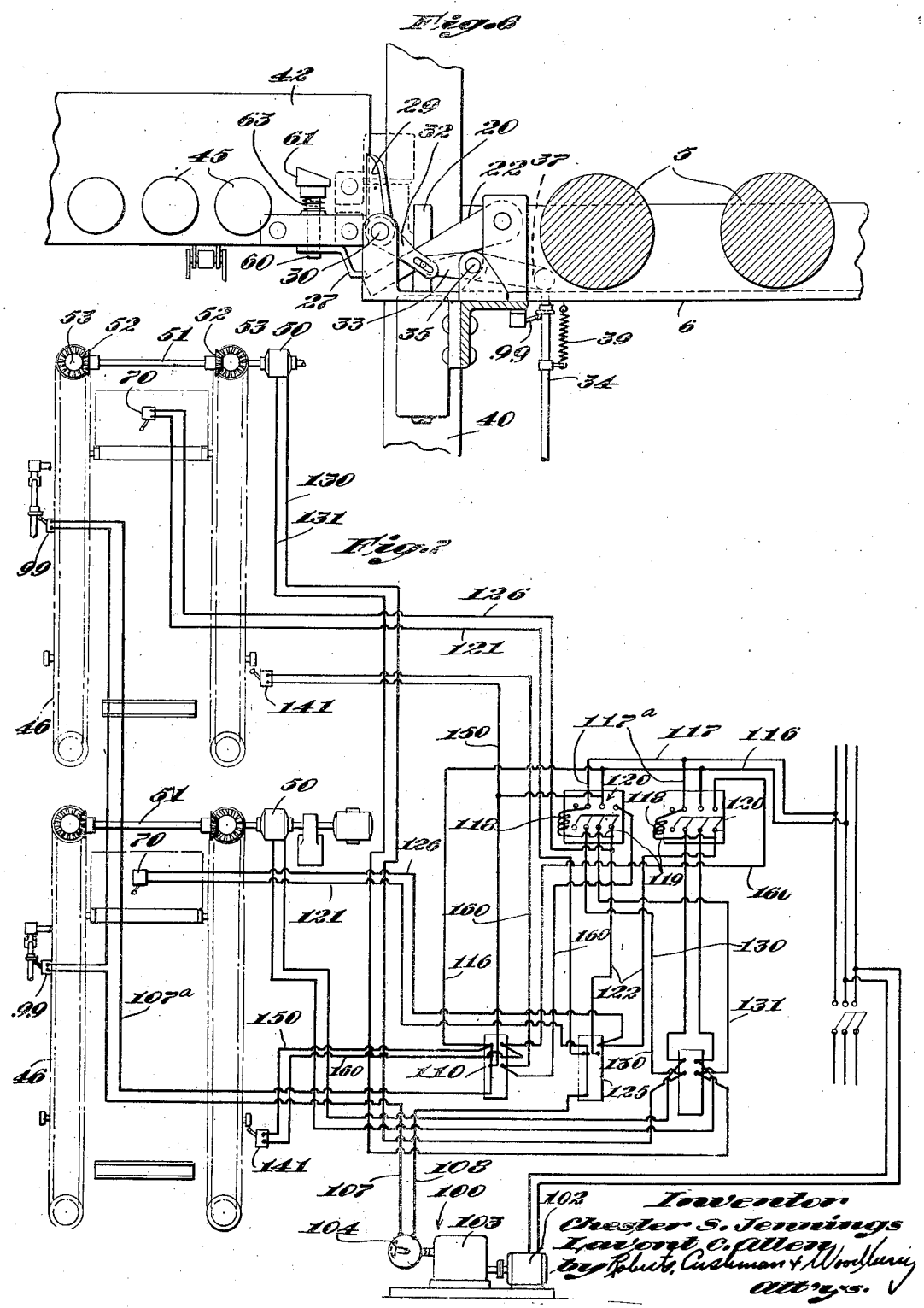

Patented Nov. 4, 1930

1,780,486

UNITED STATES PATENT OFFICE

CHESTER S. JENNINGS AND LAVONT C. ALLEN, OF SYRACUSE, NEW YORK, ASSIGNORS TO THE LAMSON COMPANY, OF SYRACUSE, NEW YORK, A CORPORATION OF MASSACHUSETTS

CONVEYER SYSTEM

Application filed March 30, 1929. Serial No. 351,147.

This invention relates to improvements in conveyer apparatus, and more particularly to apparatus of the type adapted to convey a plurality of articles or carriers to a common conveyer.

The present invention is particularly directed to an arrangement of substantially vertically movable cars which are adapted to receive articles from a plurality of horizontally disposed conveyer sections or work stations and to deposit the same upon an elongate conveyer at another level. In certain conveyer installations in factories and the like, it is usual to provide an elongate conveyer system with a plurality of auxiliary conveyers or work stations disposed along the same and with means to divert articles or carriers from the main conveyer to the work stations. For example, selectively operable deflector apparatus of the general type disclosed in Patent No. 1,535,075 to T. S. Knap may be conveniently utilized for this purpose. In order to permit convenient disposal of the articles or carriers which are thus left at the work stations, the present invention provides a series of vertically moving cars which are adapted to receive the articles, after suitable operations have been performed thereon, and to carry the same to a load receiving conveyer located at another level. This conveyer may be continued so that it joins the original main conveyer in order to permit the passage of articles to subsequent work stations beside the main conveyer for successive operations.

The present invention is particularly directed to an arrangement of elevators, or lowerators, (the latter term being used as succinctly descriptive of substantially vertically moving conveyers which are adapted to move articles or carriers from a higher to a lower level) which are so arranged in synchronism that interference between the articles deposited by the same upon the single elongate conveyer is avoided. To this end, common timing means are provided such that the elevators move in synchronism to deposit articles upon the receiving conveyer at suitably spaced intervals and in such manner that one article does not interfere with an article received from an adjoining elevator or lowerator.

The present invention furthermore affords control means which may be utilized to prevent the movement of an article or carrier box into the region of the elevator or lowerator shaft until the vertically movable car arrives to the proper position for the reception of such article or carrier. In the preferred embodiment of the invention, a stop, operated by the lowerator itself, is provided to prevent movement of the carriers to the lowerator, until its load carrying portions have arrived at the proper position in alignment with the auxiliary conveyer or work station, and there is also a selectively controllable stop which normally prevents movement of the article to the vertically moving car. Thus, an article will not be received by the elevator until both of the stops are lowered, one of the same being lowered automatically in response to the proper positioning of the elevator, and the other being operable at the discretion of the operator at the work station or any other desired point.

In accordance with the present invention means are also preferably provided so that only those cars which have articles or carriers thereon are moved in synchronism with the other cars, so that movement of empty elevators, or lowerators, is avoided. Additional means is provided to prevent the movement of the lowerators, when an article or carrier box has only partially passed onto one of the same.

Thus, in general, means are provided automatically to receive articles from a plurality of work stations and to deposit the same without interference with each other upon a single elongate conveyer at another plane, means being provided to prevent the movement of articles or carriers to the vertically movable cars except in accordance with the predetermined arrangement.

In the accompanying drawings which exemplify a concrete embodiment of the invention:

Fig. 4 is a plan view of a lowerator, with driving and guide means therefor, and the adjoining portion of a work station;

Fig. 5 is a section on line 5—5 of Fig. 4;

Fig. 6 is an enlarged section on line 6—6 of Fig. 4; and

Fig. 7 is a wiring diagram illustrating one manner of controlling the lowerators in synchronism and ensuring the same against movement at times when such movement would be objectionable.

Figure 1:
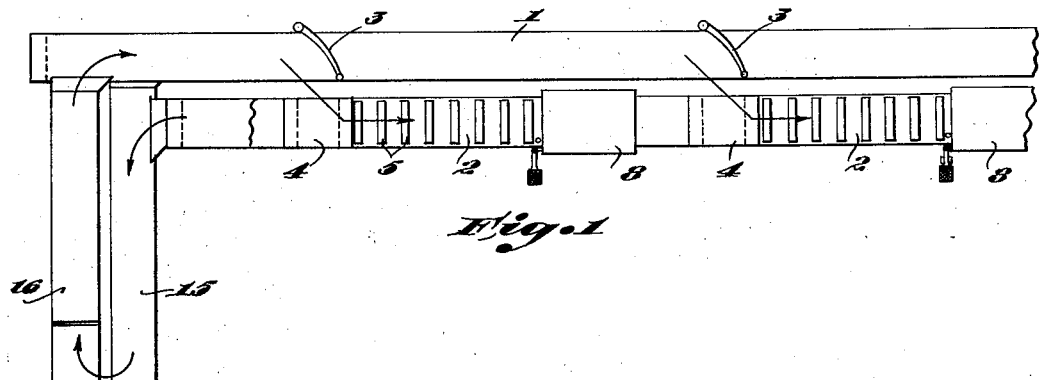
Fig. 1 is a plan view, more or less diagrammatic in character, showing one mode of arranging conveyer mechanism and vertically moving supports, such as lowerators, in accordance with the present invention.
Figure 2:
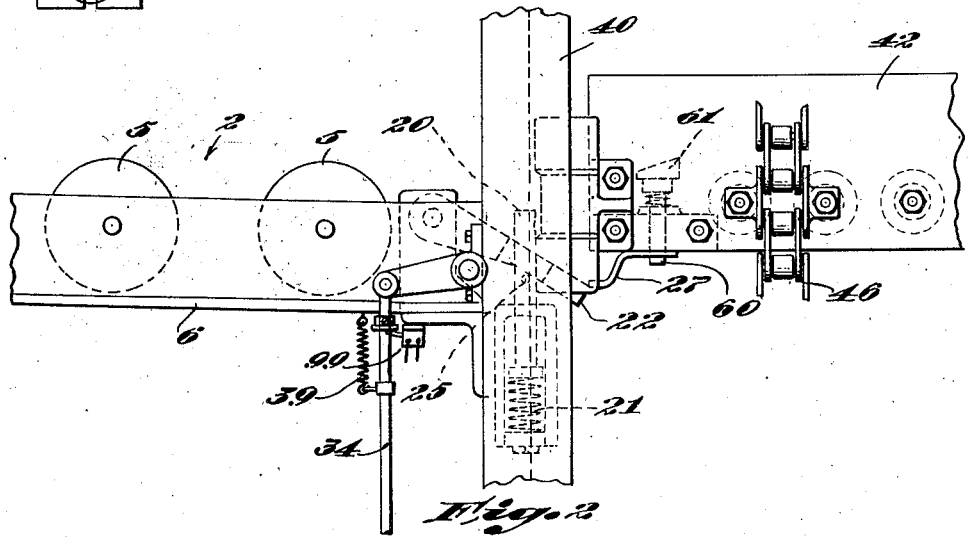
Fig. 2 is an elevational detail of the portion of a work station and the adjoining portion of a lowerator showing other related parts.
Figure 3:
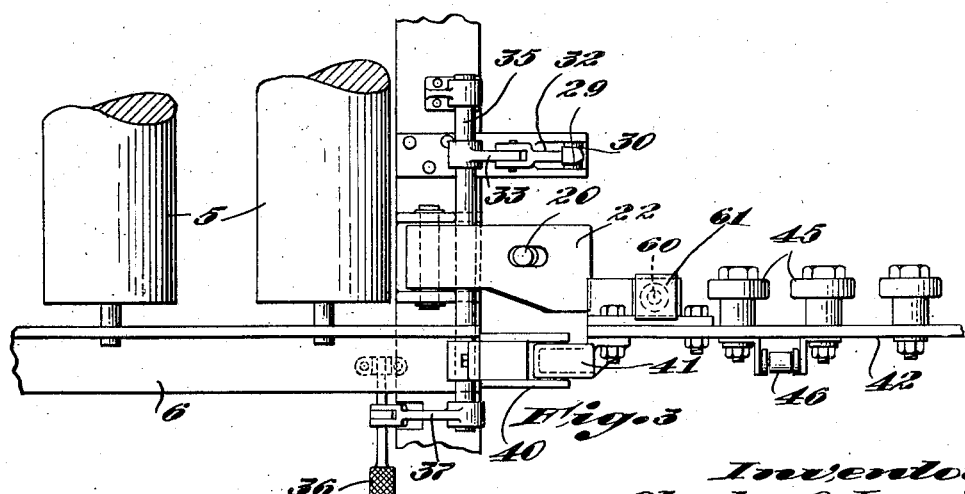
Fig. 3 is a top plan view of the assembly shown in Fig. 2.

In the accompanying drawings, the numeral 1 designates a longitudinally movable main conveyer beside which a plurality of work stations 2 may be located, it being understood that successive or concomitant operations may be performed upon conveyed articles at these various stations. Any suitable means for diverting the articles from the main conveyer to the work stations may be provided, such as the deflectors 3 which are adapted to be selectively swung outwardly across the path of articles carried by the main conveyer. Suitable auxiliary belts 4 may be arranged adjoining each of these deflectors in order to decelerate articles passing from the main conveyer to the work stations as more particularly disclosed, described, and claimed in our copending application Serial No. 349,358, filed March 23, 1929.

The work stations 2 may comprise a plurality of freely rotatable supporting rolls 5 which receive the articles or carrier box from the auxiliary conveyer belts 4. A suitable shaft 8 is arranged at the delivery end of each work station, said shafts containing lowerators comprising suitable vertically moving supports to receive container boxes or the like from the work stations, and to carry the same to a lower level where the containers or the like are disposed upon a single elongate conveyer belt 12 or the like (Fig. 5). This latter conveyer, assisted by inclined conveyers 15 and 16 may be arranged to return the articles to the main conveyer 1 from which they may be diverted by deflectors 3 to other work stations for a subsequent operation.

If desired, the rolls 5 may be supported upon suitable side rails 6 which may be arranged in the same horizontal plane, and the carrier boxes or the like are pushed onto the lowerators when the same are properly positioned, but, in accordance with the preferred embodiment of this invention, the portion of the carrier station which adjoins the lowerator shaft may be inclined downwardly so that a carrier box or the like naturally tends to move toward this shaft until it engages a suitable stop or the like adjoining the entrance to the shaft. For example, such a stop may comprise a plunger 20 normally urged upward by a spring 21. A pivotally mounted control arm 22 projects into the path of a part of the lowerator car and has an intermediate portion engaging a pin 25 projecting from plunger 20. Accordingly movement of the lowerator support downwardly into a position substantially in alignment with the rolls 5 results in the depression of the plunger 20 so that it no longer prevents movement of containers toward the lowerator shaft. Preferably a suitable downwardly projecting finger 27 is carried by the lowerator to engage the arm 22 as shown, and preferably these parts are so arranged that the plunger 20 is fully depressed just before the lowerator arrives at its position in alignment with the rolls 5. Thus a carrier box or the like may pass over the end of the plunger and hold the same depressed while the lowerator car is in its article receiving position.

An additional stop 29 is pivotally mounted upon a shaft 30 provided with an arm 32 which has a pin and slot connecting with the end of a crank arm 33 on a shaft 35. The opposite end of the latter has a crank arm 37 pivotally connected to a link 34 which may be pulled downwardly by the actuation of a pedal 36. A spring 39 is arranged to return the stop 29 to its normal position.

The lowerator shaft is preferably provided with guide elements at each of its four corners, these elements each comprising a pair of upright channels 40 which receive blocks 41 at the end of support bars 42. The latter are arranged at each side of the lowerator and carry a plurality of rolls 45; these bars have their ends connected to vertically moving chains 46 which are supported upon upper and lower sprockets 48 and 49 respectively. As illustrated, each chain is connected to a pair of bars, the bars being spaced apart by half the length of the chain and each bar is connected to a pair of chains at one side of the lowerator, so that it is always substantially horizontal. Corresponding bars carried by opposite pairs of chains are at the same level, thus cooperating to comprise vertically movable lowerator car or elevators. Fig. 5, for example, shows the bars at the upper portion of the lowerator shaft.

Each lowerator is provided with driving means comprising an electric motor 50, a drive shaft 51, and suitable beveled gears 52 which drive shafts 53 carrying sprockets 48 which engage and drive the chains respectively at the four corners of the lowerator at the same speed so that opposite bars 42, with the rolls carried thereby remain at corresponding levels throughout their movement. The arrangement of pairs of bars, as shown, is such that a movement of the sprockets and chains which results in exactly one-half of a chain passing over a sprocket permits one pair of bars at opposite sides of the lowerator shaft to move downwardly from the top to substantially the bottom of the same, and the other pair of bars to move to the position which was occupied by the first pair at the beginning of this downward movement; thus, each pair of bars alternately forms a downwardly moving conveyer car and is returned during the similar movement of the other pair of bars to its normal article receiving position.

Due to the spaced relation of the bars 42 and the rolls 45 carried thereby, they are adapted to move downwardly at each side of the lower conveyer belt 12 which, as shown more particularly in Fig. 5, passes through the lower portion of each one of the aligned lowerator shafts. This arrangement permits carrier boxes or the like which have their edges resting upon the rolls 45 to be deposited upon the moving conveyer belt 12 as the lowerator cars move downwardly; the carriers are then conveyed by the belt to any suitable point of disposal, for example being carried back to the main conveyer belt 1 for recirculation.

In order to prevent accidental movement of the carrier box or the like off of the lowerator, suitable plungers 60 are mounted upon the ends of each of the bars 42, these plungers having heads 61 with inclined upper faces and normally being urged upwardly by springs 63. Due to the inclination of the faces of these plungers, articles passing onto the lowerators depress the same, but when articles such as carriers have passed inwardly beyond the plungers they rise upwardly presenting vertical surfaces which positively prevent movement of the boxes longitudinally. The parallel faces of bars 42 also prevent undesirable lateral movement of carriers, while inturned ends 65 of the bars act as stops to limit the movement of the carriers longitudinally.

In order to permit a plurality of the lowerators to receive articles or carrier boxes from the corresponding work stations, and to deposit the same upon the single receiving belt 12 without interference of the articles with each other, the present invention affords special control means permitting the movement of the lowerators in synchronism, for example, causing simultaneous downward movement of each of the lowerators which carry a container box or the like. Furthermore, means are associated with such synchronized control means to prevent the downward movement of empty lowerators in synchronism with the other lowerators, and additional means are associated with such control means to prevent the downward movement of the lowerators when a container has only partially passed onto one of the same.

For this purpose a timer 100 is provided, comprising a constant speed motor 102 which, through suitable gear reduction mechanism 103, drives a rotary contact 104 at reduced speed. The contact 104 during brief, definitely spaced intervals forms an electrical connection between leads 107 and 108. Switches 99 are arranged in series in the lead 107, these switches being operatively associated with the stops 29 of each of the series of lowerators so that the switch will be opened when the stop is depressed as, for example, when a container has but partially passed onto the lowerator. It is thus evident that even when contact 104 closes the connection between leads 107 and 108, current will not pass through these leads if any of the switches 99 are held open due to a box being partially loaded onto the corresponding lowerator. A return lead 107ª from switches 99 is connected to one side of a circuit breaker panel 110 from which lead 116 extends to one side of the main current supply line. The opposite side of this line is connected to a lead 117 and branches 117ª thereof which correspond in number to the number of lowerators controlled by the apparatus. For convenience of illustration we have specifically shown two control switches and two lowerators in the wiring diagram of Fig. 7, but it is evident that a larger number of lowerators may be similarly controlled.

Electromagnets 118 are connected to each of the leads 117ª. These magnets are arranged to close multiple arm switches 120, which normally are held open by spring means or the like and which are closed only during the energization of their respective magnets 118. Current from the magnets 118 passes through leads 119 to the parallel leads 122 which, through leads 126 are connected to the switches 70 that are located upon each of the lowerators. These switches are arranged to be closed when a load passes onto the lowerator, remaining closed until the load moves downwardly out of switch closing position. Return leads 121 from switches 70 are connected to the lead 108 which has previously been described.

It is thus evident that current may pass to the magnets 118 when the corresponding switches 70, all of the switches 99, and the timer 100 are properly conditioned. The intermediate arms of the switches as shown are arranged to connect leads 117 and 116 with the parallel leads 130 and 131 respectively, which are connected to the individual driving motors 50 for the lowerators so that movement of each of the lowerators will be initiated in response to the closing of a corresponding switch 120 as a result of the energization of its controlling magnet. One of the other arms of each switch 120 is connected to the lead 119 which extends to the corresponding magnet 118, while the contact opposite this arm is connected through a lead 160 to a circuit breaker 141 adjoining each of the lowerators. This circuit breaker comprises a switch normally held open by a spring or the like and adapted to be closed when one of the lowerator bars 42 approaches a position which it will occupy when the other of the bars carried by the same pair of chains stops in its load receiving position. A return lead 150 connects each of the circuit breakers 141 with the lead 116. Thus, as soon as a switch 120 is closed, the controlling magnet will also receive current through the circuit breakers 141, leads 119, 150 and 160, so that opening of switch 70 as the carrier moves out of engagement with the same does not de-energize the magnet. Actuation of the circuit breaker by engagement with the lowerator bar will open the circuit passing through the leads 117, 119, 160, 150 and 116 which maintain the corresponding magnet in its energized condition, thus permitting the switch 120 to fly open under control of its spring.

From the foregoing it will be evident that the lowerators which have loads thereon will have their switches 70 closed until the loads are moved downwardly toward the receiving belt 12 and that, the circuit being conditioned by the closing of a switch 70, the corresponding magnet may be energized when the timer 100 permits current to pass through leads 107 and 108. Thus, assuming that the switches 99 remain closed, each of the lowerators which has a load properly positioned thereon will move downwardly when the timer permits current to pass through leads 107 and 108. Accordingly the lowerators will move substantially together, depositing articles upon the receiving belt 12 at substantially the same instant so that these articles will be properly spaced from each other and so that an article from one lowerator will not interfere with an article from another. It is to be understood that the timer 100 is arranged only to permit the movement of the lowerators after the articles which have been deposited during a previous downward movement of the lowerator cars have moved out of the vicinity of the same. The switches 99 prevent the downward movement of any of the lowerator cars when a box is but partially loaded upon its corresponding lowerator; in such a case, all of the lowerators will wait until the next timed period when the timer 100 permits their downward movement. After the bars 42 and rollers 45 have deposited their loads upon the receiving belt 12, they pass first downwardly, and then upwardly about the lower sprockets 47 to a position where they engage circuit breakers 141, causing the motor to stop as the other set of support bars 42 comes into load receiving position at the delivery end of a work station 2.

While in the preferred embodiment of this invention we have shown automatically and selectively operable stops to prevent the accidental movement of carrier boxes from the inclined work station to the lowerator shaft when the lowerator bars are not properly positioned to receive the same, in certain installations it may be found preferable to make the work station horizontal rather than inclined and to dispense with both the stops 20 and 29. In such a case it is obvious that the circuit controlling switches 99 also will be omitted.

It is thus evident that the present invention permits a plurality of lowerators to be operable in synchronism to receive loads from adjoining work stations and to deposit the same upon a single receiving belt or conveyer in such a manner that loads from successive lowerators do not interfere with each other, and further that means are associated with this arrangement so that lowerators which have not received a load do not move in synchronism with the loaded lowerators but remain at their load receiving position until a subsequent downward movement of the entire group of lowerators, and further that additional means is provided to prevent the movement of a lowerator onto which a carrier box has only partially passed.

Obviously, by reversing the direction of movement of the chains, articles might be picked up from the conveyer belt and delivered to the level of the work stations, and in the following claims we shall use the term "elevator" as broadly inclusive of devices for moving articles or material from one level to another irrespective of the direction of movement.

We claim:

1. Apparatus of the class described comprising a plurality of elevators, a conveyer arranged to receive material from each of the elevators, means for controlling the movement of the elevators so arranged that the elevators will come to a load-discharging position adjoining the conveyer means and will leave the same substantially in synchronized relation to each other, and control means enabling individual elevators to move in unison with the other elevators or to remain stationary.

2. Apparatus of the class described comprising a plurality of elevators, a conveyer arranged to receive material from each of the elevators, means for controlling the movement of the elevators, said means being arranged so that the elevators will come to a load-discharging position adjoining the conveyer means and will leave the same substantially in synchronized relation to each other, and individual control means for each elevator, said last-named means being operable in response to a certain loading of the individual elevator to permit the main control means to act upon the same.

3. Apparatus of the class described comprising a plurality of elevators, a conveyer arranged to receive material from each of the elevators, means for controlling the movement of the elevators, said means being arranged so that the elevators will come to a load-discharging position adjoining the conveyer means in synchronized relation to each other, the speed of the conveyer means, and the movement of the elevators being so determined in relation to the discharged loads that interference of the load from one elevator with a load from another elevator is avoided.

4. Apparatus of the class described comprising a plurality of work stations, a plurality of elevators, a common conveyer arranged to receive loads from the elevators, individual driving motors for each of the elevators, individual controllers permitting operation of the motors only when loads are disposed on the corresponding elevators, and common controlling means connected to the individual controllers whereby the elevators may come to their load-discharging positions in synchronized relation so that interference between the loads from different elevators is avoided.

5. Apparatus of the class described comprising loading stations, elevators movable into load receiving position at the respective stations, a common conveyer to receive loads from each of the elevators, and means to prevent interference between loads from the different elevators as they are being deposited upon the common conveyer.

6. Apparatus of the class described comprising stations, elevators movable into load receiving position at the respective stations, a common conveyer to receive loads from each of the elevators, means to prevent interference between loads from the different elevators as the loads are being deposited upon the common conveyer, and automatically actuable stops responsive to the position of the elevators to prevent movement of articles from the stations toward the elevators, except when the latter are located in receiving position.

7. Apparatus of the class described, comprising stations, elevators movable into load receiving position at the ends of the stations, a common conveyer to receive loads from each of the elevators, means to prevent interference between loads from the different elevators as the loads are being deposited upon the common conveyer, and automatically actuable stops responsive to the position of the elevators to prevent movement of articles from the stations toward the same, except when the elevators are located in load receiving position, and additional stops normally arranged to prevent such movement of articles, said latter stops being movable to inoperative position at the will of the operator.

8. Apparatus of the class described, comprising stations, elevators movable into load receiving position at the stations, a common conveyer to receive loads from each of the elevators, means preventing interference between loads from the different elevators as they are being deposited upon the common conveyer, and automatically actuable stops operative to prevent movement of articles from the stations toward the elevators except when the latter are located in load-receiving position, and other stops normally preventing such movement of articles but movable out of normal position at the will of the operator, said first-named stops being automatically depressed just before the elevators reach load-receiving position, and being retained in depressed position by the weight of the articles passing over them.

9. Apparatus of the class described, comprising a plurality of elevators, a common conveyer arranged to receive loads from each of the elevators, stations at which loads may be supplied to the elevators, individual driving means for each of the elevators, individual control means permitting actuation of the driving means only when the corresponding elevators are loaded, and a common control means permitting movement of the loaded elevators only in synchronized relation.

10. Apparatus of the class described comprising a plurality of elevators, a common conveyer arranged to receive loads from each of the elevators, stations at which loads may be supplied thereto, individual driving means for each of the elevators, individual control means permitting actuation of the driving means only when the corresponding elevators are loaded, a common control means permitting movement of the loaded elevators only in synchronized relation, and means associated with the common control means to prevent movement of the elevators so long as the corresponding load has only partially passed onto one of the same.

11. Apparatus of the class described comprising a plurality of elevators, a common conveyer arranged to receive loads from each of the elevators, stations at which loads may be delivered thereto, individual driving means for each of the elevators, individual control means permitting actuation of the driving means only when the corresponding elevators are loaded, a common control means permitting movement of the loaded elevators only in synchronized relation, stops normally elevated to prevent movement of articles from the stations to the elevators, said stops being depressible to permit such movement, and means associated with the common control means to prevent movement of the elevators when the stops adjoining the same are depressed.

12. Apparatus of the class described comprising a plurality of elevators, a common conveyer arranged to receive loads from each of the elevators, stations at which loads may be delivered thereto, an individual electric motor for driving each of the elevators, individual circuits for each of the motors, switches therein adapted to be closed when the corresponding elevator is loaded, said circuits including a common conductor and a switch in said common conductor, the closing of said switch permitting the loaded elevators to be simultaneously operated.

13. Apparatus of the class described comprising a plurality of elevators, a common conveyer arranged to receive loads from each of the elevators, stations at which loads may be delivered thereto, an individual electric motor for driving each of the elevators, individual circuits for each of the motors, electromagnetic means controlling said individual circuits, switches for controlling the electromagnetic means to close the individual motor circuits, said switches being actuable to condition the electromagnetic means to close said individual circuits when the corresponding elevator is loaded, said circuits including a common conductor and a switch in said common conductor closable to permit the loaded elevators to be simultaneously operated.

14. Apparatus of the class described comprising a plurality of elevators, a common conveyer arranged to receive loads from each of the elevators, stations at which loads may be delivered thereto, an individual electric motor for driving each of the elevators, individual circuits for each of the motors, electromagnetic means controlling said individual circuits, switches for controlling the electromagnetic means to close the individual motor circuits, said switches being actuable to condition the electromagnetic means to close said individual circuits when the corresponding elevator is loaded, and a secondary circuit to maintain said electromagnetic means thus conditioned until the corresponding elevator reaches a load-discharging position, said circuits having a common conductor and a switch in said common conductor closable to permit the loaded elevators to be simultaneously operated.

15. Apparatus of the class described comprising a plurality of elevators, a common conveyer arranged to receive loads from each of the elevators, individual electric motors for driving each of the elevators, individual circuits for each of the motors, electromagnetic means controlling said individual circuits, switches for controlling the electromagnetic means to close the individual motor circuits, said switches being actuable to condition the electromagnetic means to close said individual circuits when the corresponding elevator is loaded, and means automatically to open said individual motor circuits when the elevators reach their load-discharging position, said circuits having a common conductor and a switch in said common conductor closable to permit the loaded elevators to be simultaneously operated.

16. Apparatus of the class described comprising a plurality of elevators, a common conveyer arranged to receive loads from each of the elevators, an individual electric motor for driving each of the elevators, individual circuits for each of the motors, motor control switches in each of said individual circuits, electromagnets energizable to close said motor switches, and switches engageable by a load received by the corresponding elevator to energize the corresponding electromagnet when the corresponding elevator is loaded, said circuits having a common conductor and a switch in said common conductor closable to permit the loaded elevators to be simultaneously operated.

17. Apparatus of the class described comprising a plurality of elevators, a common conveyer arranged to receive loads from each of the elevators, an individual electric motor for driving each of the elevators, individual circuits for each of the motors, motor control switches in each of said individual circuits, electromagnets energizable to close said motor switches, and switches engageable by a load received by the corresponding elevator to energize the corresponding electromagnet when the corresponding elevator is loaded, said circuits having a common conductor and a switch in said common conductor closable to permit the loaded elevators to be simultaneously operated, and means automatically to open the motor switches when the corresponding elevators reach load-discharging position.

18. Apparatus of the class described comprising a plurality of elevators, a common conveyer arranged to receive loads from each of the elevators, an individual electric motor for driving each of the elevators, individual circuits for each of the motors, motor control switches in each of said individual circuits, electromagnets energizable to close said motor switches, and switches engageable by a load received by the corresponding elevator to energize the corresponding electromagnet when the corresponding elevator is loaded, said circuits having a common conductor and a switch in said common conductor closable to permit the loaded elevators to be simultaneously operated, and a parallel circuit for energizing each electromagnet, a switch in said parallel circuit closable simultaneously with the closing of the corresponding motor switch, and a second switch in the parallel circuit automatically operable to open the same when the elevator reaches its load-discharging position.

19. Apparatus of the class described comprising a plurality of elevators, a common conveyer arranged to receive loads from each of the elevators, an individual electric motor for driving each of the elevators, individual circuits for each of the motors, motor control switches in each of said individual circuits, electromagnets energizable to close said motor switches, and switches engageable by a load received by the corresponding elevator to energize the corresponding electromagnet when the corresponding elevator is loaded, said circuits having a common conductor and a switch in said common conductor closable to permit the loaded elevators to be simultaneously operated, and a parallel circuit for energizing each electromagnet, a switch in said parallel circuit closable simultaneously with the closing of the corresponding motor switch, and a second switch in the parallel circuit automatically operable to open the same when the elevator reaches its load-discharging position, and a main control switch permitting the closing of the elevator switches in synchronized relation only at timed intervals.

20. Apparatus of the class described comprising a plurality of devices each movable along a predetermined path from load-receiving to load-delivering position, means adapted to move all of said devices synchronously, and control means preventing movements of any of such devices which has not received a load but permitting the loaded devices to move in unison.

21. Apparatus of the class described comprising a plurality of devices each movable along a predetermined path from load-receiving to load-delivering position, means adapted to move all of said devices synchronously, and control means preventing movement of any of said devices while any one of said devices is receiving its load.

22. Apparatus of the class described comprising a plurality of devices each movable along a predetermined path from load-receiving to load-delivering position, and controlling means comprising a timer for determining the instant at which such devices may start to move, means adapted to move all of said devices in unison, and means operative to prevent such of said devices as have not received a load from starting in response to the timer.

23. Apparatus of the class described comprising a plurality of devices each movable along a predetermined path from load-receiving to load-delivering position, control means comprising a timer for determining the instant at which such devices may start to move, means adapted to move all of said devices in unison, and means to prevent any of said devices from starting during the loading of any one of said devices.

24. Apparatus of the class described comprising a plurality of devices each movable along a predetermined path from load-receiving to load-delivering position, control means comprising a timer for determining the instant at which such devices may start to move, means adapted to move all of said devices in unison, and means to prevent any of said devices from starting during loading of one of said devices and to prevent delivery of a load to any of such devices as is not in load-receiving position.

25. Apparatus of the class described comprising a conveyer, a plurality of spaced devices each operable to deliver a load of material to the conveyer, means adapted to move such devices synchronously toward delivery position, and means to prevent any of said devices as has not received its load from moving toward delivery position with the others.

Signed by us at Syracuse, New York, this 27th day of March, 1929.

CHESTER S. JENNINGS.
LAVONT C. ALLEN.